C. H. HACKETT & T. W. MORGAN.
DEVICE FOR USE IN CLEANING DISKS OF CENTRIFUGAL SEPARATORS.
APPLICATION FILED OCT. 12, 1908.
1,127,435.
Patented Feb. 9, 1915.
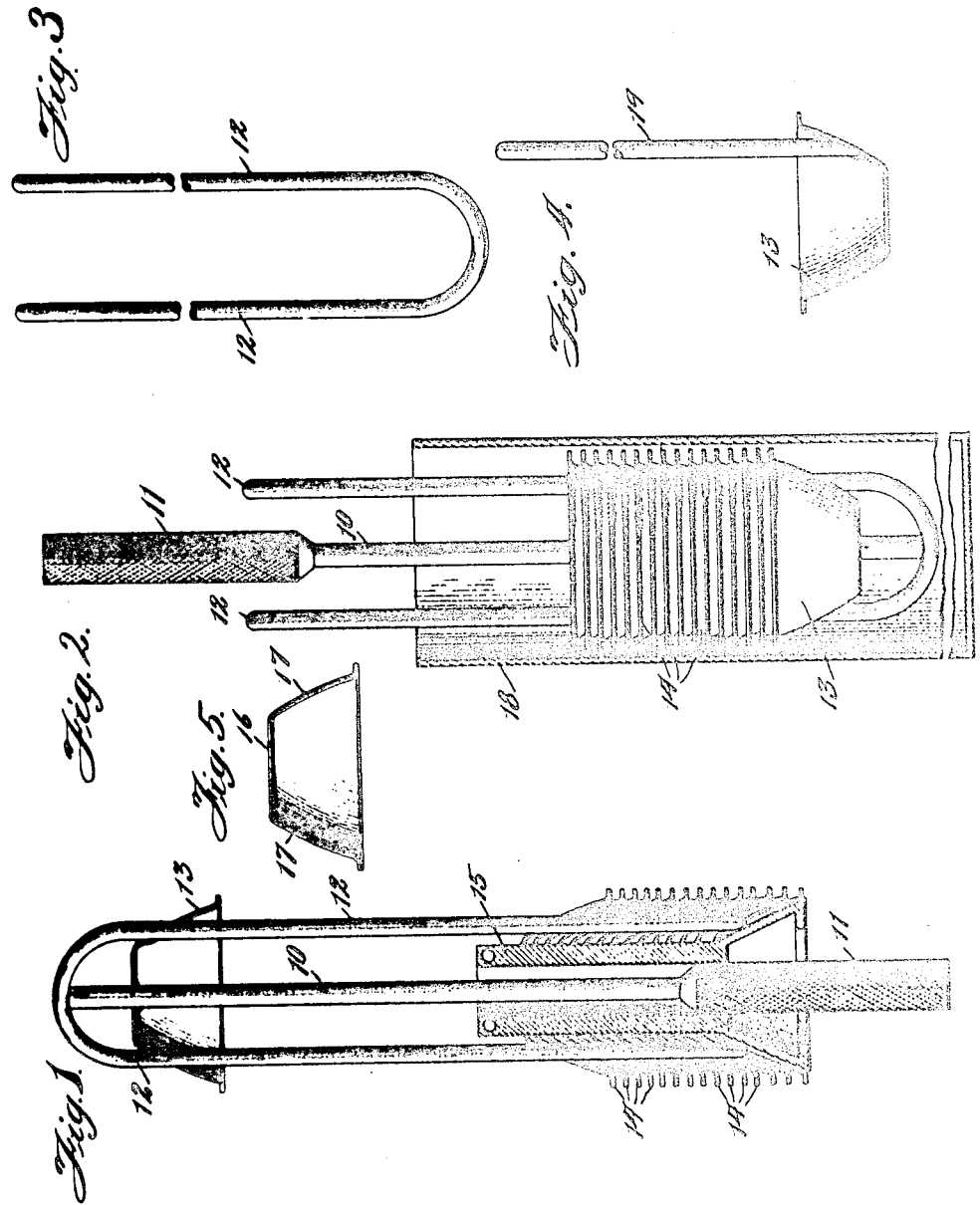

UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

DEVICE FOR USE IN CLEANING DISKS OF CENTRIFUGAL SEPARATORS.

1,127,435.  Specification of Letters Patent.   Patented Feb. 9, 1915.

Application filed October 12, 1908. Serial No. 457,269.

*To all whom it may concern:*

Be it known that we, CHARLES H. HACKETT and THOMAS W. MORGAN, citizens of the United States, residing at Waterloo, Blackhawk county, State of Iowa, have invented certain new and useful Improvements in Devices for Use in Cleaning Disks of Centrifugal Separators, of which the following is a specification.

This invention relates to improvements in devices for use in washing or cleaning the disks of centrifugal cream separators and one of the objects of the invention is to provide improved means for holding the disks with relation to each other when removed from the separator which will at the same time permit the disks to have a free sliding movement with respect to the holding device.

A further object is to provide improved means for holding the disks and by means of which the disks may be reciprocated in a receptacle containing a cleaning liquid and which receptacle is of a diameter only slightly larger than the diameter of the disks whereby the movement of the disks in the receptacle will create a churning movement of the water to cause the water to rush in and out between the disks.

A further object is to provide an improved holder for the disks and upon which holder the disks may be spread or separated from each other to permit the disks to be properly aired.

A further object is to provide an improved device of this character which will be simple, durable and cheap in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawing illustrating the embodiment of the invention, and in which—

Figure 1 is an elevation, partly in section, of an improved device of this character constructed in accordance with the principles of this invention, showing the manner in which the device is used to remove the disks from the hollow or tubular shaft of a separator, the shaft and disk being shown in section. Fig. 2 is an elevation showing the manner in which the disks are supported upon the holder and the manner in which the disks are inserted into a receptacle containing the cleaning fluid, the receptacle being shown in section. Fig. 3 is an elevation of a modified form of the invention. Fig. 4 is an elevation partly in section of still another modified form of the invention. Fig. 5 is a detail sectional view of one of the separator disks.

Referring more particularly to the drawing and in the exemplification of the invention shown in Figs. 1 and 2, the holder preferably comprises a stem 10 at one extremity of which is located a suitable handle 11. This stem 10 may be of any desired or suitable length but is preferably somewhat extended and secured to the extremity thereof opposite to the handle 11 are rods 12 which are spaced from each other, one of which is preferably located on opposite sides of the stem 10 so that the rods 12 will be spaced from each other with the stem 10 located therebetween. These rods 12 are preferably of a length to terminate short of the end of the handle 11 so as to permit the operator to readily grasp the handle 11, and the rods 12 are preferably located in the same plane with the stem 10. Secured to the rods 12 and the stem 10 adjacent the extremity where the stem and rods are connected and in any desired or suitable manner, is a cup or cone shaped member 13 which opens in a direction toward the handle 11. The separator cups or cone-shaped disks 14 when in use are supported by the tubular shaft or core 15 of the separator and each of these disks 14 is provided with a central aperture 16 through which the core or shaft 15 passes, and a plurality of apertures or openings 17, one of which is arranged on each side of the opening 15 and preferably diametrically opposite to each other.

When it is desired to remove the disks 14 from the shaft 15 for the purpose of cleaning, the shaft 15 and the disks 14 supported thereby may be first removed from the separator after which the holder may be inverted to the position shown in Fig. 1 so that the handle 11 and stem 10 will pass through the opening in the tubular shaft or core 15 and the rods 12 will pass through fore we would not wish to be understood as limited to the exact details shown and described, but

What we claim is—

1. A device for removing, replacing and washing disks of a centrifugal separator, consisting of a rod for engaging apertures in the separator disks, and a cup-shaped support secured to the rod.

2. A device for removing, replacing and washing disks of a centrifugal separator, consisting of a U-shaped rod adapted to engage apertures in the disk, and a handle secured to the rounded portion of the rod extending parallel with and beyond the ends of the extremities of the U-shaped rod.

3. A device for removing, replacing and washing disks of a centrifugal separator, consisting of a substantially U-shaped rod the extremities of which are adapted to be inserted through apertures in the separator disks and thus to assist in removing them from the machine and subsequently replacing them after being cleansed, and a support for the disks secured to both parallel extremities of the rod at the bent end thereof.

4. A device for removing, replacing and washing disks of a centrifugal separator, consisting of a U-shaped rod adapted to engage apertures in the disks, a support on the rod for the disks, and a handle secured to the rounded portion of the rod extending parallel with and beyond the ends of the extremities of the rod.

In testimony whereof we have signed our names to this specification, in the presence of two subscribing witnesses, on this fifth day of October A. D. 1908.

CHARLES H. HACKETT.
THOMAS W. MORGAN.

Witnesses:
JAS. M. HUBBARD,
A. M. MEADER.

Copies of this patent may be obtained for five cents each, by addressing the "Commissioner of Patents, Washington, D. C."